May 24, 1932.  G. M. BELLANCA  1,859,277

FUSELAGE CONSTRUCTION

Filed Nov. 8, 1930

Inventor
GIUSEPPE M. BELLANCA

Semmes + Semmes
Attorneys

Patented May 24, 1932

1,859,277

UNITED STATES PATENT OFFICE

GIUSEPPE M. BELLANCA, OF NEW CASTLE, DELAWARE

FUSELAGE CONSTRUCTION

Application filed November 8, 1930. Serial No. 494,363.

This invention relates to aircraft and more particularly to an improved fuselage for airplanes and a method for making same.

Heretofore fuselages for airplanes have been made of wood or metal framework covered with surfacing material of some sort, such as airplane cloth or sheet metal. While bodies built in this manner have proved very successful, they have severely taxed the skill of the designers in securing the necessary degree of strength while preserving the lightness of construction. Furthermore, manufacturing fuselages of this construction entails many difficult and expensive machine and manual operations and requires considerable time.

The primary object of this invention is to overcome the above and other disadvantages in the prior art.

Another object of this invention is to provide a fuselage construction in which the surfacing or covering material is made up in a plurality of similarly curved sections.

Still another object of this invention is to provide a fuselage, all continuous surfaces of which are formed with the same curvature.

Yet another object of this invention is to provide a fuselage, the surface of which is made up in a plurality of parts, all of which may be formed with the same compound curvature.

Another object of this invention is to provide a method of constructing airplane fuselages in which the time and expense required to properly cover the fuselage frame is reduced to a minimum.

With the above and other objects in view this invention consists of a fuselage having a covering made up of a plurality of plates, the plates all being of the same curvature so that they may be formed on a single die.

It is to be understood that the term "plate", as used in this application, is not limited to metallic plates but is intended to refer to sheets made of any substance capable of being formed or shaped such, for instance, as ply-board.

For the purpose of facilitating a clear understanding of this invention, one embodiment thereof has been illustrated in the accompanying drawings, and specifically set forth in the following description, it being clearly understood that any changes may be made in this embodiment which do not depart from the scope of this invention as defined by the appended claims.

Figure 1:
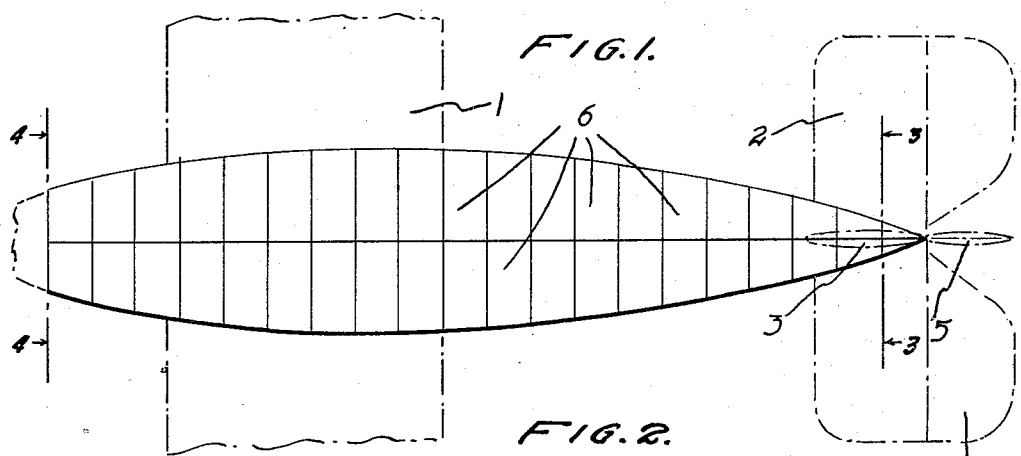
Figure 1 is a plan view of an airplane fuselage embodying my invention.
Figure 2:
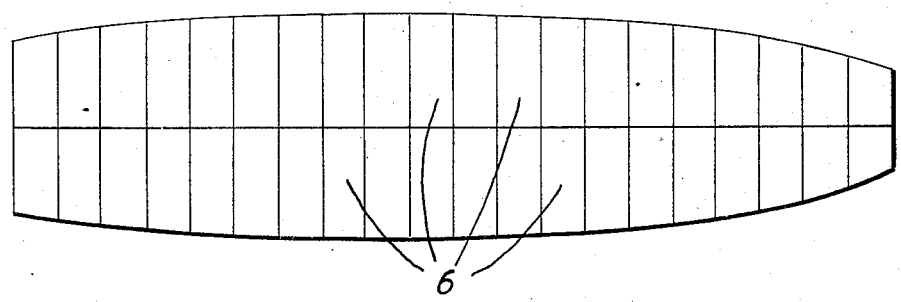
Figure 2 is a side view of the fuselage illustrated in Figure 1.
Figures 3, 4:
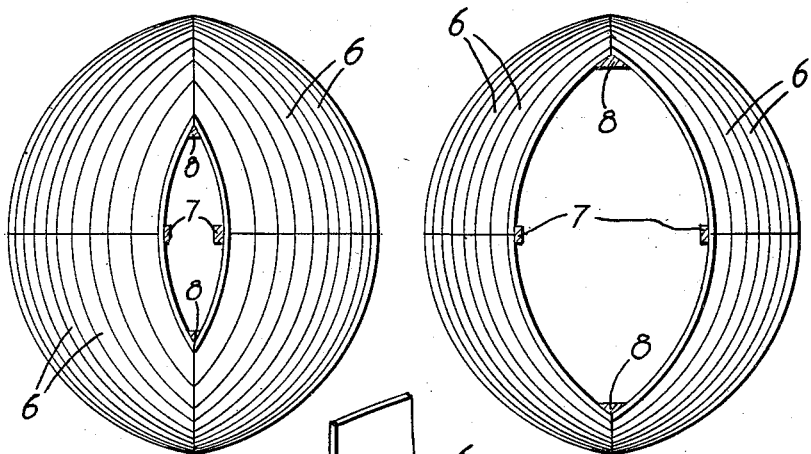
Figure 3 is a section taken along the line 3—3 of Figure 1.
Figure 4 is a section taken along the line 4—4 of Figure 1.
Figure 5:
Figure 5 is a detail view of one of the plates covering the improved fuselage.

Referring now more particularly to the drawings, there is shown diagrammatically in Figure 1 an airplane, parts of which are broken away for the sake of conservation of space. As here shown this airplane consists of a fuselage to which are attached the wing 1 and the customary empennage. This empennage consists as usual of tail planes 2, fin 3, elevators 4 and rudder 5.

Referring now to Figures 1 to 4 inclusive, there is illustrated a fuselage embodying the novel construction of this invention. The frame is so constructed that the outer surface of the fuselage will be formed with the same curvature from nose to tail and the same curvature about its circumference at all points from its nose to its tail. Thus the surfacing will be such that any given part will possess a compound curvature identical with that of any other part.

In forming the surfacing material the preferred method is first to cut, form, or stamp out the plate sections 6 in the correct outlines for the various positions which they are to occupy. Then, since they all are to be formed with the same compound curvature, they may all be formed in a single die. After this is done, all that remains is to rivet or otherwise fasten the various plates in their respective positions on the longeron members 7 and 8.

If desired, instead of cutting or stamping the plates to size before the forming operation, the blanks may first be formed in the die and applied to the frame. The superfluous parts of the plates may then be trimmed off by hand or by a portable trimming machine.

While in the illustration shown in the drawings the plates are shown as having parallel edges other shapes might be used as well. For instance, in the drawings it will be seen that each half of the fuselage represents the portion of a torus which would be cut off by a plane passed parallel to the axis and at a distance therefrom equal to or greater than the mean radius of the torus. The edges of the plates are defined by planes passed through the torus parallel to each other and to the axis of the torus and perpendicular to the first-mentioned plane. It might instead be desirable to define the edges of these plates by planes passed through the axis of the torus and forming equal angles with each other. In such a case the plates would all be identical except for their length. It will be seen that these plates might then all be stamped out on identically the same pattern before the forming operation. Then after being applied to the frame their ends could be trimmed to the proper length in the manner above described. The advantage of this method lies in the fact that all the plates may be cut out on a single pattern instead of each being on a different pattern, as in the form shown in the drawings. The number of plates used may of course be varied according to the judgment of the designer, either a greater or a smaller number being used.

It will be appreciated that the fuselage might be materially widened by separating the two portions of the torus along the central plane of the fuselage and covering the gap thus formed with plate or other members of any desirable shape. By this construction the available space within the fuselage may be greatly increased.

It will be appreciated that by making the covering for the fuselage of a plurality of comparatively small plates and fastening each one rigidly to the longéron members, the frame will be materially reinforced, allowing the elimination of some of the usual frame bracing parts.

It will be further appreciated that there has been provided a fuselage which has most of the advantages embodied in those formerly in use, and which is, in addition, much easier and cheaper to manufacture.

Also, there has been provided a method of manufacturing fuselages for airplanes in which a number of pieces of manufacturing apparatus may be eliminated.

It is noted, as above pointed out, that various modifications may be made in the method and apparatus herein disclosed and described without exceeding the scope of my invention as defined in the appended claims, it being distinctly understood that the prior art and the claims alone are to be definitive of this invention.

I claim:

1. An airplane fuselage having an outer surface such that if it be divided into two equal parts by a longitudinal vertical plane, each part will represent that portion of a torus cut off by a plane passing through the torus parallel to the axis thereof and at a distance from said axis greater than the mean radius of the torus.

2. An airplane fuselage having an outer surface consisting of a plurality of plates, each of said plates representing that portion of a torus which is defined by three planes parallel to the axis of the torus, two of said planes being parallel to each other and perpendicular to the third, said third plane cutting the torus at a distance from the axis equal to or greater than the mean radius of the torus.

In testimony whereof I affix my signature.

GIUSEPPE M. BELLANCA.